United States Patent
Bowman et al.

(10) Patent No.: US 7,165,514 B2
(45) Date of Patent: Jan. 23, 2007

(54) VARIABLE SPEED FAN DRIVE

(75) Inventors: Dennis Aaron Bowman, Cedar Falls, IA (US); Eric Albert Keen, Waterloo, IA (US); Andy Blaine Appleton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 106 days.

(21) Appl. No.: 10/959,367

(22) Filed: Oct. 6, 2004

(65) Prior Publication Data

US 2006/0070588 A1   Apr. 6, 2006

(51) Int. Cl.
*F01P 7/02* (2006.01)
(52) U.S. Cl. .................................... 123/41.12
(58) Field of Classification Search ............. 123/41.12, 123/41.49, 41.47, 41.46, 41.48, 41.65
See application file for complete search history.

(56) References Cited

U.S. PATENT DOCUMENTS

| | | | |
|---|---|---|---|
| 3,872,842 A | 3/1975 | Medley .................... | 123/41.12 |
| 4,124,001 A | 11/1978 | Samuel et al. ............ | 123/41.12 |
| 4,425,766 A | 1/1984 | Claypole .................... | 62/133 |
| 4,489,680 A | 12/1984 | Spokas et al. ............ | 123/41.05 |
| 4,541,821 A | 9/1985 | Sakakibara ................. | 474/17 |
| 4,899,861 A | 2/1990 | Cummings, III ............. | 192/85 |
| 4,920,929 A | 5/1990 | Bishop ..................... | 123/41.49 |
| 5,059,161 A * | 10/1991 | Bredt ........................ | 475/269 |
| 5,477,827 A | 12/1995 | Weisman, II et al. ....... | 123/436 |
| 5,483,927 A | 1/1996 | Letang et al. ............. | 123/41.12 |
| 5,529,028 A | 6/1996 | Weikert .................... | 123/41.12 |
| 5,855,266 A | 1/1999 | Cummings, III ......... | 192/58.42 |
| 6,453,853 B1 | 9/2002 | Hawkins et al. ......... | 123/41.12 |
| 6,508,213 B2 | 1/2003 | Powers .................... | 123/41.12 |
| 2003/0041814 A1 | 3/2003 | Laird et al. .............. | 123/41.12 |

FOREIGN PATENT DOCUMENTS

JP          61076808         10/1987

* cited by examiner

*Primary Examiner*—Stephen K. Cronin
*Assistant Examiner*—Hyder Ali

(57) ABSTRACT

A variable fan drive for a vehicle powered by an internal combustion engine is provided. A drive side assembly utilizes a hydraulic actuator to actuate a variable sheave assembly. The variable sheave assembly drives a sheave assembly of a driven side assembly by way of a v-belt. The hydraulic actuator has a piston coupled to the variable sheave assembly. The piston is hydraulically translated by pressurized engine oil from the internal combustion engine. An electronically controlled solenoid valve controlled by an engine or vehicle controller selectively controls the flow of engine oil for piston actuation. Thus the speed of the fan can be controlled based on various engine or vehicle operating parameters.

91 Claims, 7 Drawing Sheets

VARIABLE SPEED FAN DRIVE

FIELD OF THE INVENTION

The present invention relates generally to cooling fans for vehicles. More particularly, the present invention relates to drive mechanisms for such fans. Specifically, the present invention relates to variable speed fan drives that can be controlled based on various vehicle parameters.

BACKGROUND OF THE INVENTION

Current variable speed fan drive systems used in work vehicles such as agricultural tractors typically use a viscous drive on the system cooling fan. The viscous fan drive is intended to modulate fan speed and thus air flow, with the resulting power consumption to meet the cooling needs of the vehicle in an optimal manner in an effort to conserve power and fuel. Current drives are cost effective, yet are sized to achieve the lowest cost thereby resulting in durability issues. Additionally, the fans are not as efficient as desired, especially at the mid-point of the modulation range where the desired fan speed for effective cooling resides for a very high percentage of the time in typical work vehicle applications. The problem is that at mid-range fan speeds the combination of moderate speed and moderate torque combine to produce large heat loads that both consume power and generate heat thereby deteriorating the fan drive and thus its reliability. Known fan drives are generally not allowed to modulate in this area and are moved to a higher speed to avoid excess slippage. The result is to drive the fan and its power requirements higher than needed.

Accordingly, there is a clear need in the art for a variable speed fan drive which operates at a much higher level of efficiency and results in less power loss by better optimizing the speed of the fan to the requirements of the cooling system so as to reduce engine costs, improve fuel efficiency and reliability.

SUMMARY OF THE INVENTION

In view of the foregoing, it is an object of the invention to address the issue of optimizing fan speed and power requirements to the cooling requirements of the vehicle.

Another object of the invention is the provision of a variable speed mechanism that is more efficient in eliminating excess heat generation and its deteriorating effects on reliability.

A further object of the invention is to provide a variable speed fan drive where power requirements are matched to the cooling system more precisely, resulting in lower power consumption and thus less fuel use.

An additional object of the invention is the provision of a variable speed fan drive which is modulated using a signal from a controller that is monitoring the systems needs of the vehicle.

The foregoing and other objects of the invention together with the advantages thereof over the known art which will become apparent from the detailed specification which follows are attained by a variable speed fan drive for a vehicle powered by an internal combustion engine, the fan drive comprising: a variable sheave assembly rotationally driven by the internal combustion engine of the vehicle, the variable sheave assembly being drivingly connected to a fan; and, a hydraulic actuator connected to the variable sheave assembly for variable actuation thereof so that fan speed is variable.

Other objects of the invention are attained by a variable speed fan drive for a vehicle, the vehicle powered by an internal combustion engine, the fan drive comprising: a drive side assembly having a variable sheave assembly, the variable sheave assembly being rotationally driven by a shaft, the shaft being driven by the engine of the vehicle, the variable sheave assembly being variably actuated by a hydraulic actuator assembly; a driven side assembly having a sheave assembly mounted to a shaft, the shaft being drivingly connected to a fan; a v-belt engaging both the sheave assembly of the drive side assembly and the sheave assembly of the driven side assembly so that a variable ratio is attained between the drive side variable sheave assembly and the driven side sheave assembly when the hydraulic actuator assembly is actuated, so that the speed of the fan is varied.

Further objects of the invention are attained by a drive side assembly for a fan drive of a vehicle powered by an internal combustion engine, the fan drive having the drive side assembly and also a driven side assembly, the drive side assembly being drivingly connected to a fan by way of the driven side assembly and comprising: a housing having a piston chamber therein; a piston disposed in the piston chamber of the housing; a valve connected to a source of fluid pressure and to the piston chamber; a shaft driven by the internal combustion engine, the shaft being journaled in the housing; a hub journaled in the piston and slidingly mounted on the shaft; a first sheave half mounted to the hub; and, a second sheave half mounted to the shaft; wherein the valve is operative to selectively provide fluid pressure to the piston chamber thereby actuating the piston so as to move the hub and first sheave half relative to the shaft and second sheave half to vary the speed of the fan.

Still other objects of the invention are attained by a method of varying the speed of a fan of a vehicle powered by an internal combustion engine, comprising the steps of: driving a variable sheave assembly using the internal combustion engine; driving a second sheave assembly connected to a fan via a belt from the variable sheave assembly; and, selectively providing pressurized engine oil from an oil galley of the internal combustion engine to a hydraulic actuator via an electronically controlled hydraulic valve based upon vehicle or engine operating parameters, thereby selectively actuating the variable sheave assembly using the hydraulic actuator so as to vary the ratio between the variable sheave assembly and the second sheave assembly, thereby varying the speed of the fan.

In general, a variable fan drive for a vehicle powered by an internal combustion engine is provided. A drive side assembly utilizes a hydraulic actuator to actuate a variable sheave assembly. The variable sheave assembly drives a sheave assembly of a driven side assembly by way of a v-belt. The hydraulic actuator has a piston coupled to the variable sheave assembly. The piston is hydraulically translated by pressurized engine oil from the internal combustion engine. An electronically controlled solenoid valve controlled by an engine or vehicle controller selectively controls the flow of engine oil for piston actuation. Thus the speed of the fan can be controlled based on various engine or vehicle operating parameters.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
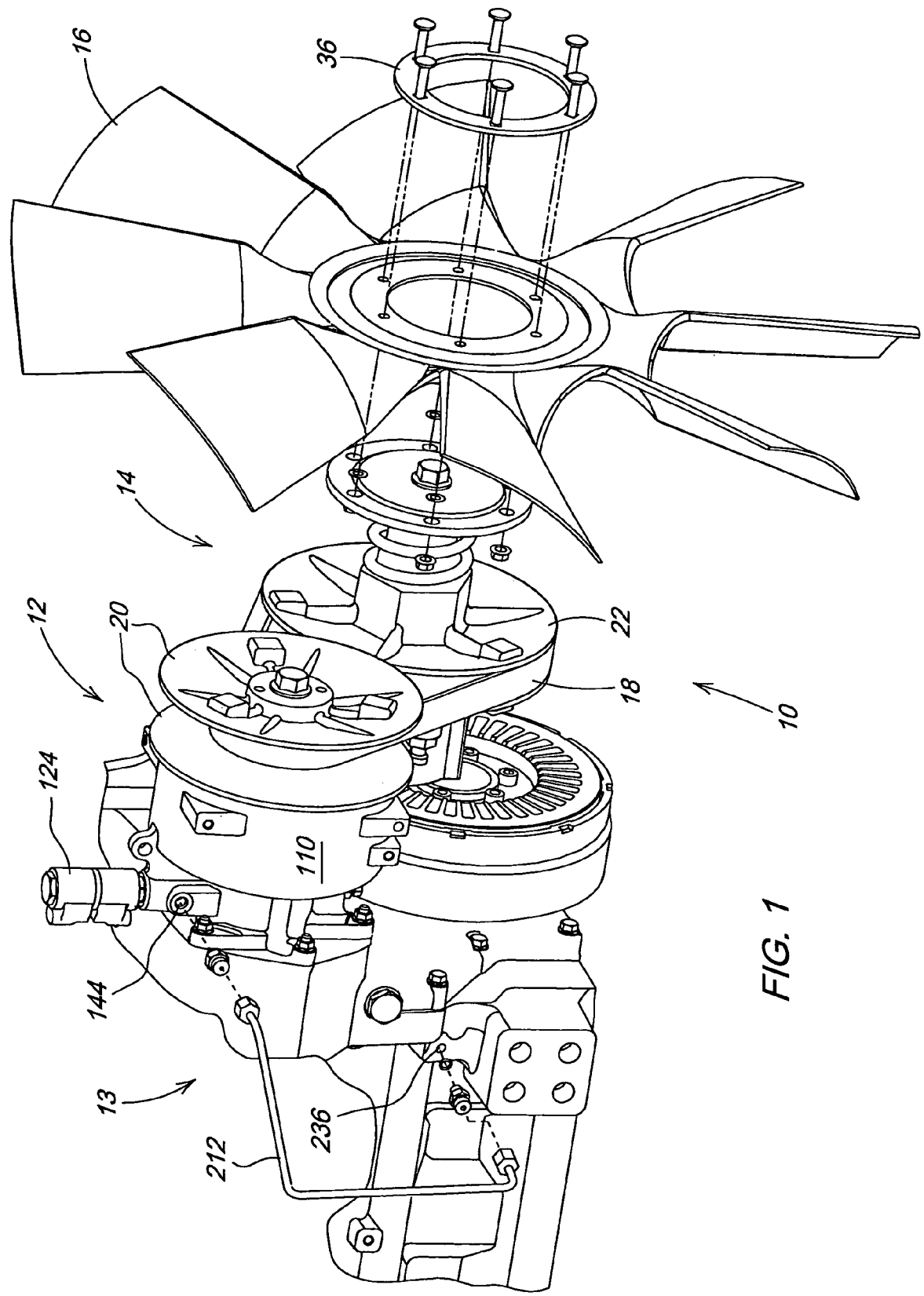
FIG. 1 is a perspective view of a fan drive assembly according to the invention.

With reference now to the drawings and particularly FIG. 1, it can be seen that a variable speed fan drive is designated generally by the numeral 10. As shown the fan drive 10 is comprised generally of a drive side assembly 12 which is operatively connected with an engine 13 of a vehicle, and a driven side assembly 14 which is operatively connected with a cooling fan 16. Power is transmitted from the drive side assembly 12 to the driven side assembly 14 by way of a v-belt 18 that engages a sheave assembly 20 on the drive side assembly 12, and a sheave assembly 22 on the driven side assembly 14.

Figure 2:
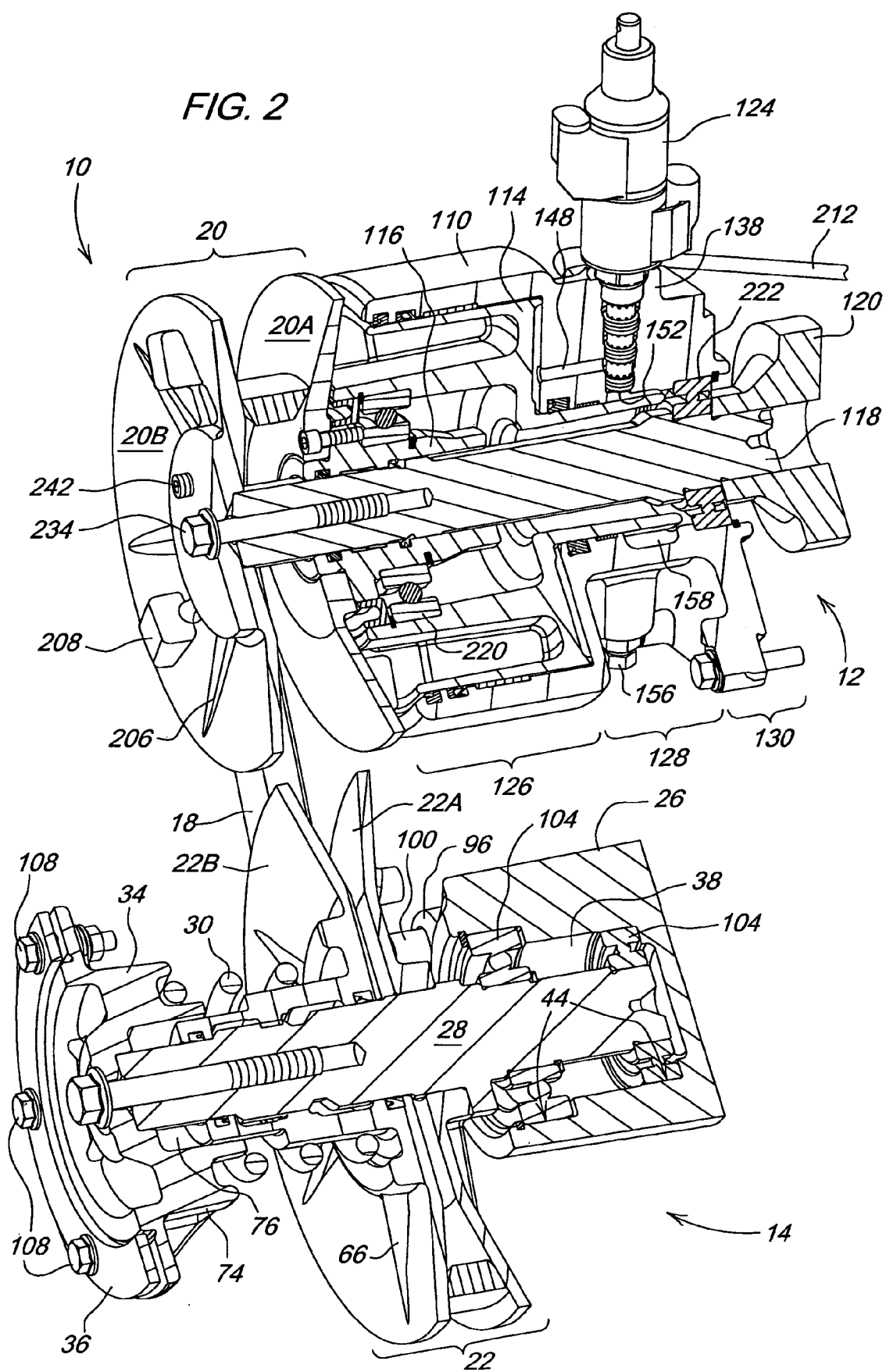
FIG. 2 is a perspective cut-away view of the drive and driven portions of the fan drive according to the invention.
Figure 3:
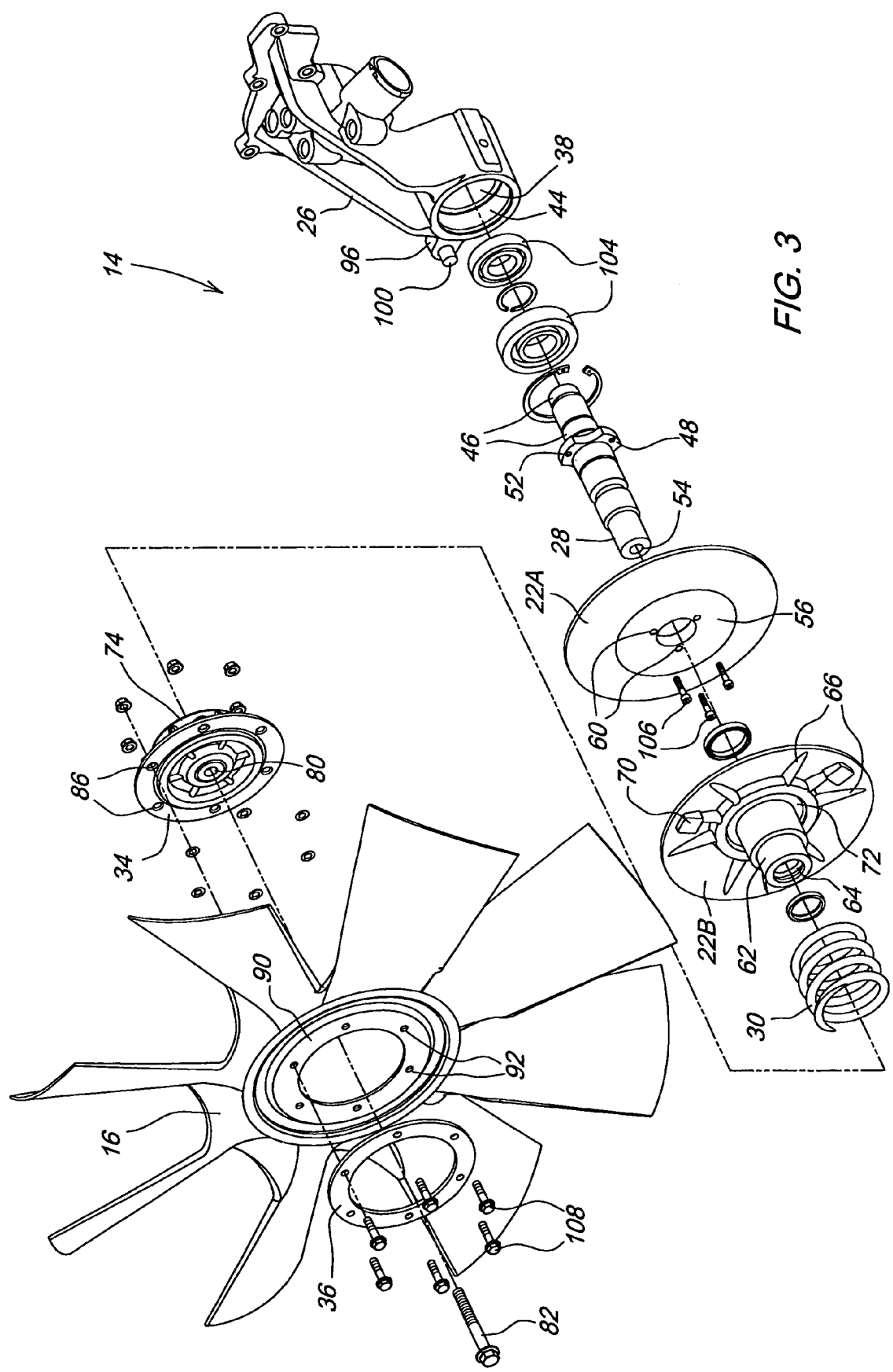
FIG. 3 is an exploded perspective view of the driven side assembly of the fan drive according to the invention.
Figure 4:
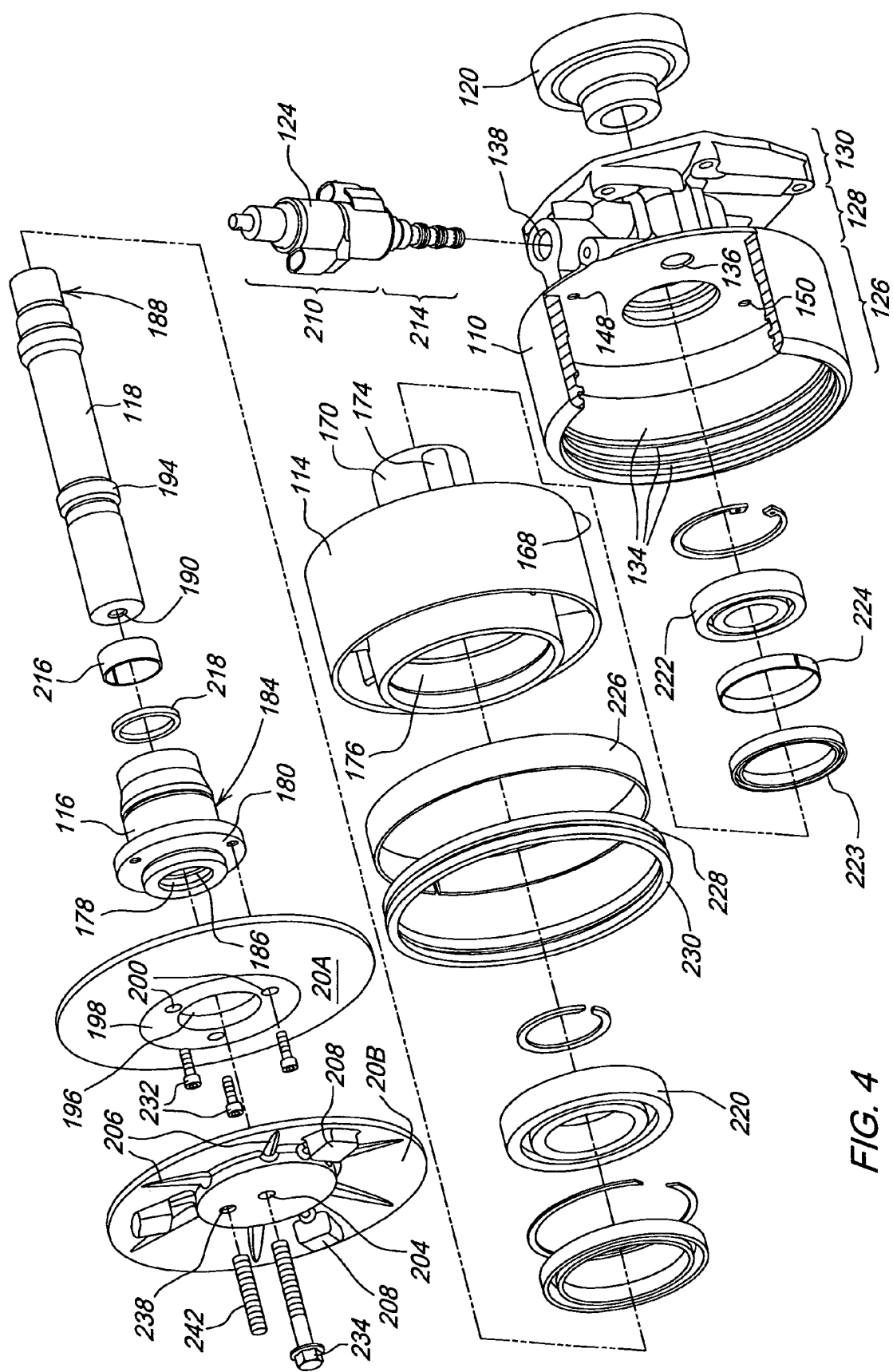
FIG. 4 is an exploded perspective view of the drive side assembly of the fan drive according to the invention.
Figure 5:
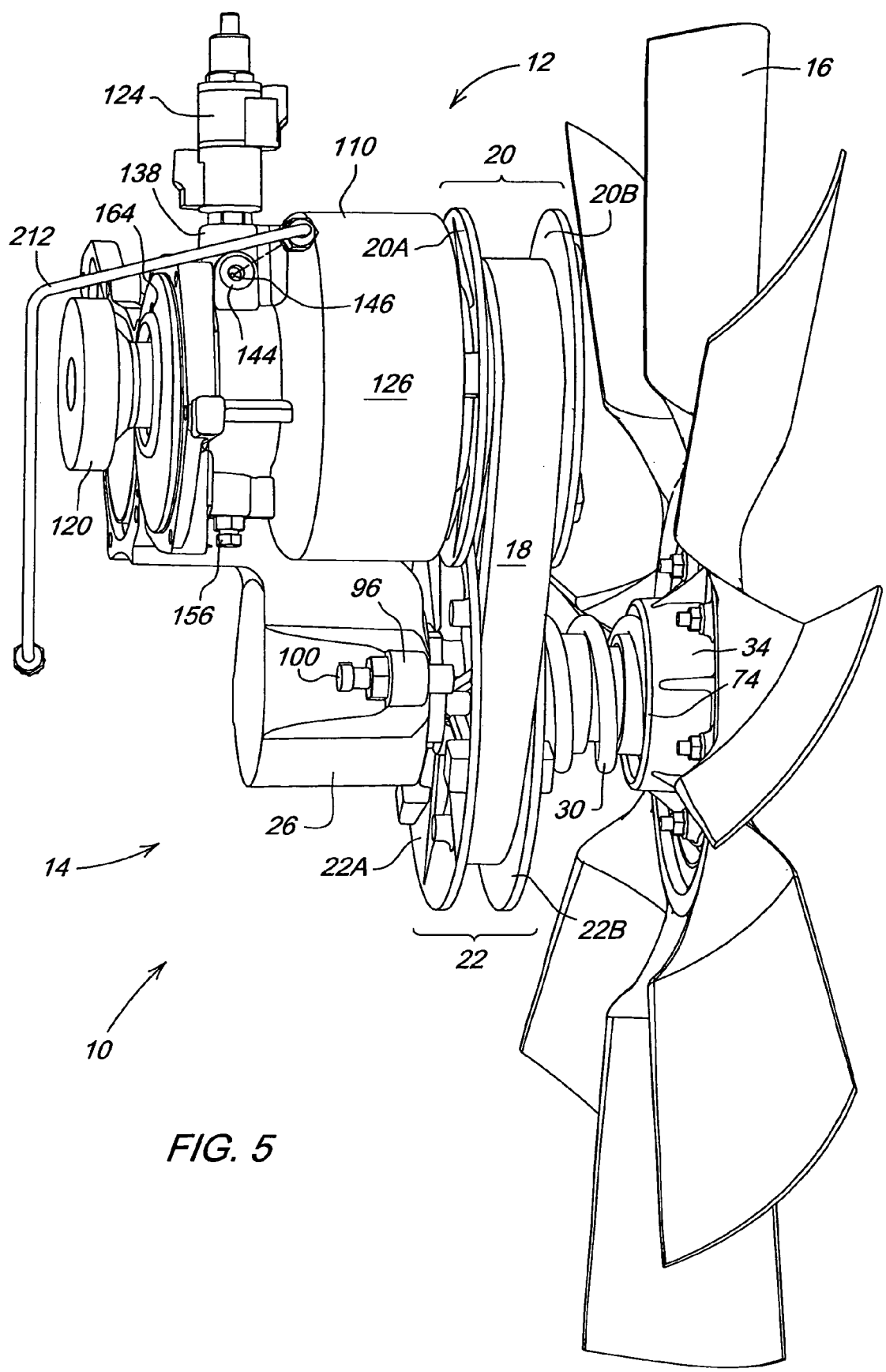
FIG. 5 is a perspective view of the fan drive according to the invention showing the orifice, drain plug and speed sensor.

Referring now to FIGS. 2, 3 and 5 it can be seen that the driven side assembly 14 generally comprises a housing 26, a shaft 28, first and second sheave halves 22A and 22B, a compression spring 30, a fan hub 34, and a fan support ring 36. The driven side housing 26, as illustrated, is in the form of a water pump housing having a cylindrical shaft and bearing support portion 38. Those having skill in the art will recognize that the driven side housing 26 need not be integrated with a water pump housing and could be a separate part. The shaft and bearing support portion 38 includes a pair of bearing support surfaces 44. As is perhaps more clearly illustrated in FIG. 5 a sensor mounting boss 96 for a magnetic speed sensor 100 is provided on the housing 26 proximal to the first sheave half 22A when the driven side assembly is assembled. The shaft 28 is a generally elongated cylindrical member having a pair of bearing mounting surfaces 46. The shaft 28 also includes a sheave mounting flange 48 with fastener apertures 52 therein. The shaft 28 further includes a fan mounting bolt aperture 54 in one end thereof.

The first sheave half 22A has a mounting surface 56 with a plurality of fastener apertures 60 therein. The second sheave half 22B has a generally cylindrical shaft mounting boss 62 with a seal groove 64 being provided therein. The second sheave half 22B also includes a plurality of strengthening ribs 66 and a plurality of wrench bosses 70 on one side thereof. A spring retaining groove 72 is provided on one side of the second sheave half 22B. A coil type compression spring 30 is provided and is adapted to matingly fit in the spring retaining groove 72 of the second sheave half 22B as will be described in more detail below.

The fan hub 34 includes a shaft boss 74 with a shaft aperture 76, as well as a fastener aperture 80 for the fan mounting bolt 82. A fan mounting flange 84 having a plurality of fastener apertures 86 therein is provided around the periphery of the shaft boss 74. The fan 16 includes a mounting surface 90 having a plurality of fastener apertures 92 to allow the fan 16 to be mounted to the fan hub 34 by way of appropriate fasteners. A support ring 36 is provided for mounting the fan 16 to the hub 34.

The driven side assembly 14 is assembled such that the shaft 28 is journaled in the housing 26 via bearings 104. The first sheave half 22A is mounted to the shaft 28 at the sheave mounting flange 48 by way of appropriate fasteners 106. Those having skill in the art will recognize that the sheave half 22A could be press fit on the shaft 28 eliminating the need for the mounting flange 48 and fasteners 106. The second sheave half 22B is slidably mounted on the shaft 28. The compression spring 30 is fitted over the shaft mounting boss 62 of the second sheave half 22B and engages the spring retaining groove 72. The fan hub 34 is also slidably fitted onto the shaft mounting boss 62 of the second sheave half 22B so that the compression spring 30 is interposed between the second sheave half 22B and the fan hub 34. The fan 16 is mounted to the fan hub 34 using the support ring 36 and appropriate fasteners 108. The fan 16 and hub 34 are secured to the shaft 28 via the mounting bolt 82.

With reference now to FIGS. 2, 4 and 5–7 it will be seen that the drive side assembly 12 comprises a housing 110, a piston 114, a hub 116, a shaft 118, a spur gear 120, a first sheave half 20A, a second sheave half 20B, and a cartridge valve 124. The housing 110 generally includes a piston chamber portion 126, a reduced diameter portion 128 and a mounting flange portion 130. The piston chamber portion 126 includes seal and retaining ring grooves 134. An anti-rotation aperture 136 is also provided in the chamber 126. A valve boss 138, having a valve cavity 140 (FIG. 6) therein, is provided adjacent to the piston chamber 126. An oil inlet 144 having a flow limiting orifice 146 communicates with the valve cavity 140 as does a first oil passage 148 to the piston chamber 126. A second oil passage 150 to the piston chamber 126 communicates with a drain port 154. The drain port 154 further communicates with an oil galley 158 in the housing 110. A removable plug 156 is fitted in the drain port 154. The bottom (as illustrated) of the valve cavity 140 has a lube passage 152 which communicates with the oil galley 158. An oil exhaust port passage 160 communicates between an opening 164 in the mounting flange portion 130 of the housing 110 and the oil galley 158 in the drive shaft support portion 128 of the housing 110. The housing further includes a bearing mounting surface 166.

The piston 114 comprises a main piston body 168, a reduced diameter portion 170, an anti-rotation dowel 174 and a bearing mount 176 inside the main piston body 168.

The hub 116 is a generally cylindrical member having a shaft bore 178 and a sheave mounting flange 180, as well as a bearing mounting surface 184. The shaft bore 178 of the hub 116 includes grooves 186 into which appropriate seals are fitted. The drive shaft 118 is a generally elongated member having a gear mounting surface 188 proximal to one end thereof while a sheave retaining bolt aperture 190 is provided in a second end thereof and a hub mounting surface 194 is provided therebetween. The first sheave half 20A includes a shaft aperture 196 and a hub mounting surface 198 with a plurality of fastener apertures 200 therein. The second sheave half 20B has a sheave retaining bolt aperture 204, a plurality of strengthening ribs 206, and a plurality of wrench bosses 208. The cartridge valve 124 has an electromechanical actuator portion 210 for actuating a spool portion 214. An oil supply line 212 is provided to supply pressurized oil from the engine oil galley to the housing 110 as will be further described below.

The drive side assembly 12 is assembled such that the hub 116 is slidably mounted on the drive shaft 118 at the hub mounting surface 194. A wear ring 216 and seal 218 are interposed between the drive shaft bore 178 of the hub 116 and the drive shaft 118 to establish a sliding seal between the hub 116 and shaft 118. The hub 116 and drive shaft 118 are journaled in the bearing mount 176 of the piston 114 by way of a bearing 220. The hub/shaft/piston sub-assembly is mounted in the housing 110 such that the shaft 118 is journaled in the housing 110 by way of a bearing 222. The anti-rotation dowel 174 of the piston 114 is disposed in the anti-rotation aperture 136 of the housing 110 to prevent relative rotation therebetween. The piston 114 and hub 116 are thus slidably mounted relative to the shaft 118 and housing 110. A seal 223 and ring 224 seal the reduced diameter portion 170 to the drive shaft support portion 128. A wear ring 226, seal 228, and wiper 230 are interposed between the piston 114 and housing 110 so as to establish a sliding seal therebetween. The spur gear 120 is mounted on the gear mounting surface 188 of the shaft 118 extending out of the housing 110. The cartridge valve 124 is fitted into the valve mounting boss 138 so that the spool portion 214 is disposed in the valve cavity 140. The oil supply line 212 is connected to the oil inlet 144. The first sheave half 20A is secured to the hub 116 by way of appropriate fasteners 232 and the second sheave half 20B is secured to the shaft 118 by way of a sheave retaining bolt 234.

A jacking screw aperture 238 can be provided on the second sheave half 20B for the purpose of moving the first sheave half 20A, hub 116 and piston 114 by way of a jacking screw 242 when needed for servicing. The wrench bosses 70 and 208 provided on the sheave halves 20A, 20B, 22A and 22B allow service personnel to turn or hold the sheave halves as needed for servicing using appropriate tools.

The housing 110 is mounted to the engine 13 such that the spur gear 120 is driven by the timing gear train (not shown) of the engine 13 and the oil outlet 160 is in communication with the engine oil galley (not shown). The oil supply line 212 is connected between the oil inlet 144 of the housing 110 and a port 236 on the engine block communicating with the oil galley (not shown) of the engine 13. As such the drive shaft 118 is driven by the engine 13 and pressurized oil is provided to the drive side assembly 12 for actuating the piston 114. The cartridge valve 124 is electrically connected with an engine or vehicle controller (not shown), as is the magnetic speed sensor 100 mounted on the driven side housing 26. Thus the controller, through the use of an appropriate algorithm, can send appropriate actuation signals to the cartridge valve 124 based upon fan speed and other engine parameters. When an appropriate signal is received by the cartridge valve 124 it is actuated such that pressurized oil from the engine oil galley is allowed to flow over the flow limiting orifice 146 into the first oil passage 148 to the piston chamber 126. Accordingly, the piston 114 is translated in the chamber 126 along with the hub 116 and first sheave half 20A. As the first sheave half 20A is moved closer to the second sheave half 20B the v-belt 18 is caused to ride higher in the v-groove effectively established between the sheave halves 20A and 20B, so as to vary the ratio between the drive side sheave assembly 20 and the driven side sheave assembly 22. The compression spring 30 allows the second sheave half 22B of the driven side assembly 14 to translate relative to the first sheave half 22A in response to changes of the drive side sheave assembly 20. Thus the speed of the fan 16 can be regulated semi-independently of the input speed of the spur gear 120 and shaft 118. By pulsing the cartridge valve 124 incremental movement of the piston 114 can be accomplished to attain varying sheave ratios. When the cartridge valve 124 is actuated such that the oil inlet 144 is closed, oil is allowed to exhaust from the piston chamber 126 through the passages 148 and 152 to the oil galley 158 and out to the oil exhaust port opening 164 by way of the oil exhaust port passage 160 to be returned to the engine oil galley. Because of the orientation of the oil passage 160 a nominal amount of oil is retained at the bearing 220 for lubrication even with vehicle inclination angles of up to 30 degrees. The drain plug 156 can be unseated from the seat 240 to drain oil from the piston chamber 126 to the oil galley 158 when required for servicing. In this manner no oil is lost from the system in retracting the piston 114.

Figure 6:
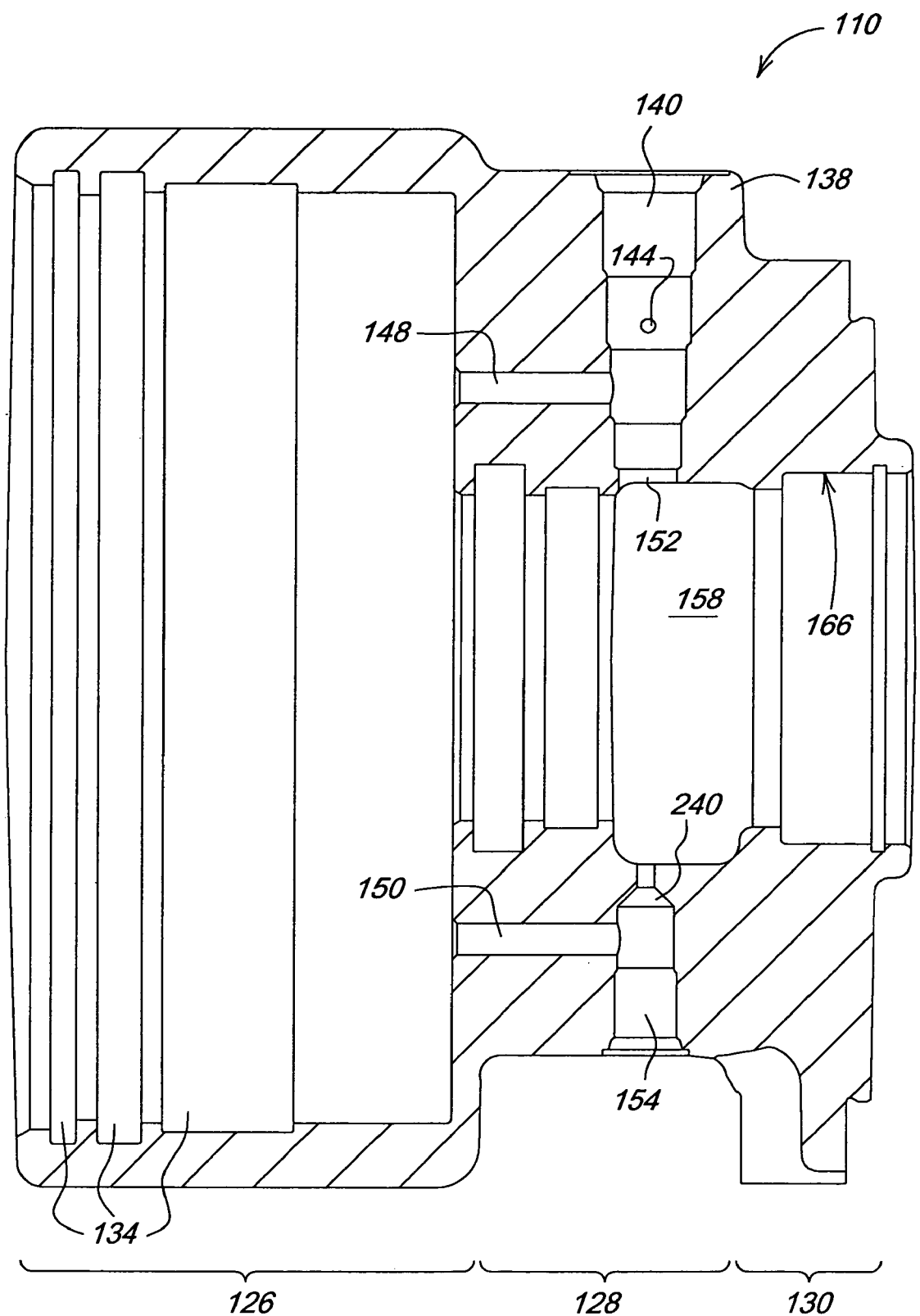
FIG. 6 is a first cut-away view of the housing of the drive side assembly according to the invention.
Figure 7:
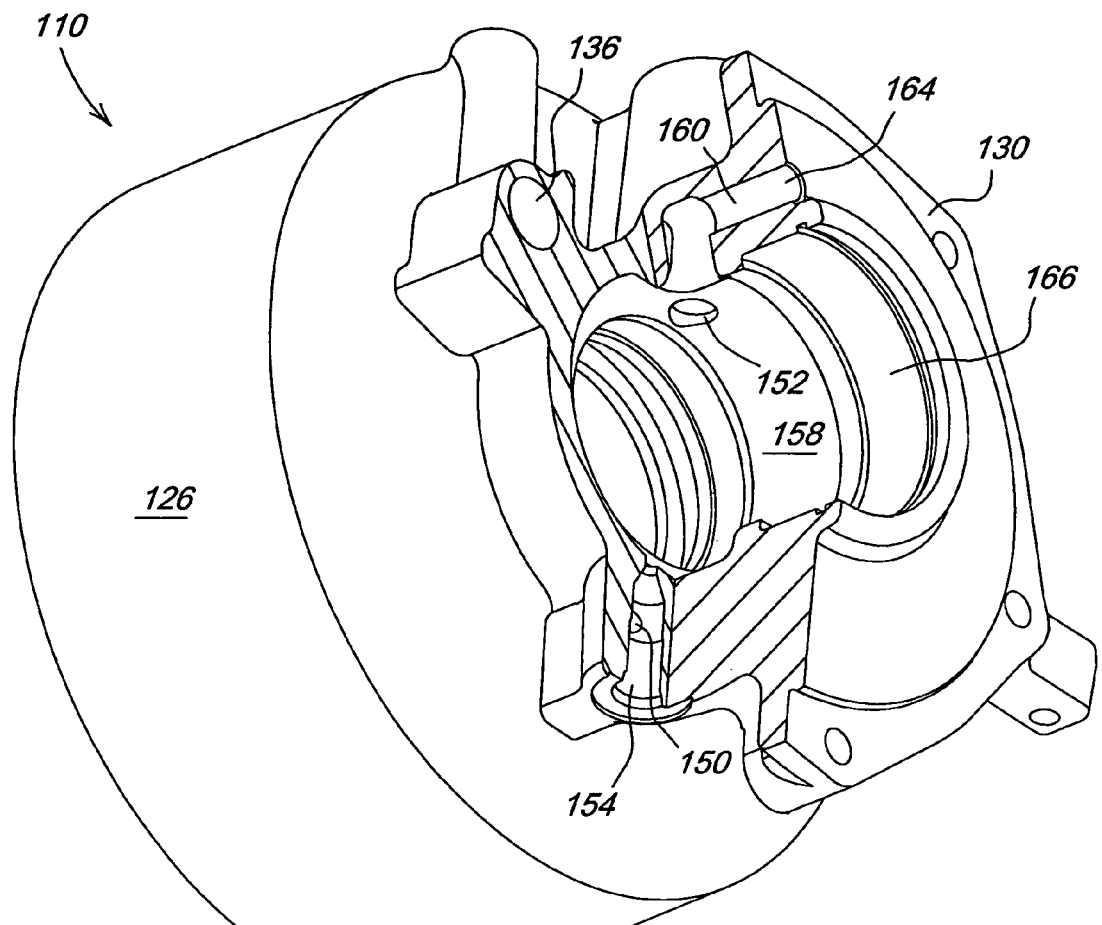
FIG. 7 is a second cut-away view of the housing of the drive side assembly according to the invention.
Figure 8:
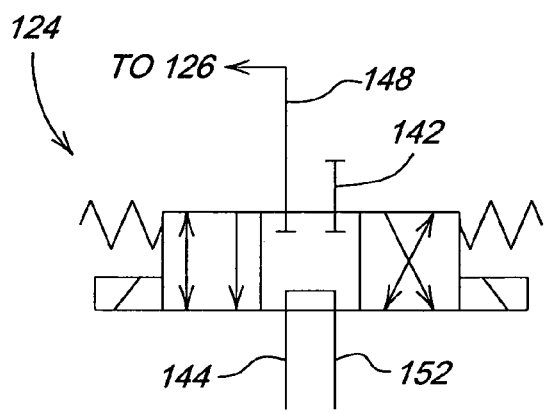
FIG. 8 is schematic representation of the cartridge valve used in conjunction with the invention; and, FIG. 9 is a simplified cross section of the valve cavity used in conjunction with the cartridge valve of FIG. 8.
Figure 9:
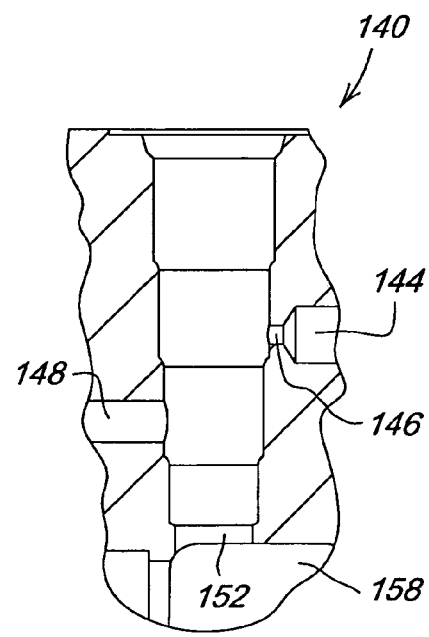

In FIGS. 8 and 9 the cartridge valve 124 and valve cavity 140 used in conjunction with the invention are illustrated. FIG. 9 has been simplified to more readily illustrate the various passages connected to the valve cavity. As shown in FIG. 6 the preferred embodiment has the passage 144 oriented perpendicular to the passage 148. The cartridge valve 124 is a known solenoid operated 4 way 3 position, direct acting, spool type hydraulic valve. However, the valve 124 in the present application is used as a 3 way 3 position valve. The cavity 140 is specially adapted for this purpose. More particularly, one of the passages normally used for a 4 way 3 position valve is unused in the cavity 140 (FIG. 9) of the present invention leaving only three passages 144, 148, and 152 as active. A fourth valve port 142 shown on the schematic of FIG. 8 is not used in the present application and is blocked in all positions by the cavity 140. Accordingly, in a first position the oil inlet passage 144 is connected directly with the lube passage 152 while the passage 148 is blocked so that no pressurized oil is provided to nor can oil leave the piston chamber 126. In a second position the oil inlet 144 is connected with the oil passage 148 to the piston chamber 126 so that pressurized oil is directed into the piston chamber 126 thereby actuating the piston. In the second position the lube passage 152 is blocked. In a third position the pressurized oil inlet 144 is blocked and the oil passage 148 is connected with the lube passage 152 allowing oil to drain from the piston chamber 126. All oil passing from the engine to the fan drive is limited in flow by the orifice 146.

Use of pressurized engine oil for actuating the fan drive 10 simplifies construction and eliminates the need for an additional and/or more complex hydraulic system. Because the drive of the present invention does not generate heat like viscous drives the fan can be modulated throughout its speed range to optimize fan speed and power requirements based on engine operating parameters. The lack of heat generation also results in improved durability of parts because the deteriorative effects of heat are avoided.

The unique bearing mounting arrangement described above allows the shaft, hub and sheave to rotate relative to the non-rotating housing and piston while simultaneously allowing the hub and sheave to translate relative to the housing in accordance with actuation of the piston.

The invention described above lends itself to a method of controlling a fan by driving a variable sheave assembly using the internal combustion engine, driving a second sheave assembly connected to a fan via a belt from the variable sheave assembly and, selectively providing pressurized engine oil from an oil galley of the internal combustion engine to a hydraulic actuator via an electronically controlled hydraulic valve based upon vehicle or engine operating parameters. The variable sheave assembly is thus selectively actuated using the hydraulic actuator so as to vary the ratio between the variable sheave assembly and the second sheave assembly. Accordingly, the speed of the fan is varied.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method of varying the speed of a fan of a vehicle powered by an internal combustion engine, comprising the steps of:
    driving a variable sheave assembly using the internal combustion engine;
    driving a second sheave assembly connected to a fan via a belt from the variable sheave assembly; and,
    selectively providing pressurized engine oil from an oil galley of the internal combustion engine to a hydraulic actuator via an electronically controlled hydraulic valve based upon vehicle or engine operating parameters, thereby selectively actuating the variable sheave assembly using the hydraulic actuator so as to vary the ratio between the variable sheave assembly and the second sheave assembly, thereby varying the speed of the fan.

2. A variable speed fan drive for a vehicle powered by an internal combustion engine, the fan drive comprising:
    a variable sheave assembly rotationally driven by the internal combustion engine of the vehicle, the variable sheave assembly being drivingly connected to a fan; and,
    a hydraulic actuator connected to the variable sheave assembly for variable actuation thereof so that fan speed is variable the hydraulic actuator comprising a housing, a piston, a piston chamber in the housing, a control valve and an oil line providing pressurized engine oil to the control valve from an oil galley of the engine, the control valve selectively allowing pressurized oil to flow to the piston housing to actuate the piston based on control signals from an engine controller.

3. A variable speed fan drive according to claim 1 wherein the hydraulic actuator further comprises a shaft journaled in the housing, a hub journaled in the piston, the hub and piston being slidingly mounted on the shaft, a spur gear mounted on the shaft, a first sheave half of the variable sheave assembly mounted on the hub and a second sheave half of the variable sheave assembly mounted on the shaft so that when the piston is actuated the hub and first sheave half are moved relative to the shaft and second sheave half.

4. A variable speed fan drive according to claim 3 wherein a valve boss having a valve cavity therein, is provided on the housing adjacent to the piston chamber.

5. A variable speed fan drive according to claim 4 wherein an oil inlet communicates with the valve cavity as does a first oil passage to the piston chamber.

6. A variable speed fan drive according to claim 5 wherein the housing includes a second oil passage communicating between the piston chamber and a drain port.

7. A variable speed fan drive according to claim 6 wherein the valve cavity has a lube passage which communicates with an oil galley in the housing.

8. A variable speed fan drive according to claim 3 wherein the hub is a generally cylindrical member having a shaft bore, a sheave mounting flange and a bearing mounting surface.

9. A variable speed fan drive according to claim 3 wherein the hub and shaft are journaled in the piston by way of a bearing.

10. A variable speed fan drive according to claim 9 wherein the hub, shaft, and piston are mounted in the housing such that the shaft is journaled in the housing by way of a bearing.

11. A variable speed fan drive according to claim 7 wherein the valve is fitted into the valve mounting boss so that a portion thereof is disposed in the valve cavity.

12. A variable speed fan drive according to claim 11 wherein the valve is electrically connected with an engine controller.

13. A variable speed fan drive according to claim 12 wherein the engine controller sends actuation signals to the valve based upon fan speed, vehicle and engine parameters.

14. A variable speed fan drive according to claim 13 wherein when an appropriate signal is received by the valve it is actuated such that pressurized oil from the engine oil galley is allowed to flow into the first oil passage to the piston chamber so as to translate the piston in the chamber along with the hub and first sheave half.

15. A variable speed fan drive according to claim 14 wherein when the valve is actuated such that the oil inlet is closed, oil is allowed to exhaust from the piston chamber through passages to the oil galley in the housing and out to the oil exhaust port opening by way of the oil exhaust port passage to be returned to the engine oil galley.

16. A variable speed fan drive according to claim 11 wherein the valve is a solenoid operated 4 way 3 position hydraulic valve used as a 3 way 3 position valve.

17. A variable speed fan drive according to claim 16 wherein in a first position the oil inlet passage is connected directly with the lube passage while the passage to the piston chamber is blocked so that no pressurized oil is provided to the piston chamber.

18. A variable speed fan drive according to claim 16 wherein in a second position the lube passage is blocked, the oil inlet passage is connected with the oil passage to the piston chamber so that pressurized oil is directed into the piston chamber thereby actuating the piston.

19. A variable speed fan drive according to claim 16 wherein in a third position the pressurized oil inlet passage is blocked and the oil passage to the piston chamber is connected with the lube passage allowing oil to drain from the piston chamber.

20. A variable speed fan drive for a vehicle, the vehicle powered by an internal combustion engine, the fan drive comprising:
   a drive side assembly having a variable sheave assembly, the variable sheave assembly being rotationally driven by a shaft, the shaft being driven by the engine of the vehicle, the variable sheave assembly being variably actuated by a hydraulic actuator assembly, the hydraulic actuator comprising a housing, a piston, a piston chamber in the housing, a control valve and an oil line providing pressurized engine oil to the control valve from an oil galley of the engine, the control valve selectively allowing pressurized oil to flow to the piston housing to actuate the piston based on control signals from an engine controller;
   a driven side assembly having a sheave assembly mounted to a shaft, the shaft being drivingly connected to a fan;
   a v-belt engaging both the sheave assembly of the drive side assembly and the sheave assembly of the driven side assembly so that a variable ratio is attained between the drive side variable sheave assembly and the driven side sheave assembly when the hydraulic actuator assembly is actuated, so that the speed of the fan is varied.

21. A variable speed fan drive according to claim 20 wherein the driven side assembly comprises a housing, a shaft, first and second sheave halves, a compression spring, a fan hub.

22. A variable speed fan drive according to claim 21 wherein the driven side housing has a cylindrical shaft and bearing support portion.

23. A variable speed fan drive according to claim 21 wherein the driven side housing is integrated with a water pump housing.

24. A variable speed fan drive according to claim 22 wherein the shaft and bearing support portion includes a pair of bearing support surfaces.

25. A variable speed fan drive according to claim 20 wherein the driven side assembly includes a fan speed sensor.

26. A variable speed fan drive according to claim 25 wherein the driven side housing has a sensor mounting boss for mounting the speed sensor proximal to the first sheave half when the driven side assembly is assembled.

27. A variable speed fan drive according to claim 25 wherein the speed sensor is connected with an engine controller of the vehicle.

28. A variable speed fan drive according to claim 27 wherein the speed sensor is a magnetic speed sensor.

29. A variable speed fan drive according to claim 21 wherein the shaft includes a sheave mounting flange.

30. A variable speed fan drive according to claim 29 wherein the shaft includes a fan mounting bolt aperture in one end thereof.

31. A variable speed fan drive according to claim 30 wherein the second sheave half has a generally cylindrical shaft mounting boss.

32. A variable speed fan drive according to claim 31 wherein the second sheave half includes a spring retaining groove on one side thereof.

33. A variable speed fan drive according to claim 32 wherein the compression spring is adapted to matingly fit on the shaft mounting boss and in the spring retaining groove of the second sheave half.

34. A variable speed fan drive according to claim 33 wherein the fan hub includes a shaft boss having a shaft aperture.

35. A variable speed fan drive according to claim 34 wherein a fan mounting flange is provided around the periphery of the shaft boss.

36. A variable speed fan drive according to claim 35 wherein the shaft is journaled in the housing via bearings.

37. A variable speed fan drive according to claim 36 wherein the second sheave half is slidably mounted on the shaft.

38. A variable speed fan drive according to claim 37 wherein the fan hub is slidably mounted on the shaft mounting boss of the second sheave half so that the compression spring is interposed between the second sheave half and the fan hub.

39. A variable speed fan drive according to claim 38 wherein the fan is mounted to the fan hub.

40. A variable speed fan drive according to claim 20 wherein the drive side assembly further comprises a shaft journaled in the piston housing, a hub journaled in the piston, the hub and piston being slidingly mounted on the shaft, a spur gear mounted on the shaft, a first sheave half mounted on the hub and a second sheave half mounted on the shaft so that when the piston is actuated the hub and first sheave half are moved relative to the shaft and second sheave half.

41. A variable speed fan drive according to claim 40 wherein the housing includes a piston chamber portion and a mounting flange portion.

42. A variable speed fan drive according to claim 41 wherein an anti-rotation aperture is provided in the chamber.

43. A variable speed fan drive according to claim 40 wherein a valve boss having a valve cavity therein, is provided on the housing adjacent to the piston chamber.

44. A variable speed fan drive according to claim 43 wherein an oil inlet communicates with the valve cavity as does a first oil passage to the piston chamber.

45. A variable speed fan drive according to claim 44 wherein the oil inlet includes a flow limiting orifice.

46. A variable speed fan drive according to claim 44 wherein the housing includes a second oil passage communicating between the piston chamber and a drain port.

47. A variable speed fan drive according to claim 46 wherein the drain port further communicates with an oil galley in the housing.

48. A variable speed fan drive according to claim 47 wherein a plug with a seat is fitted in the drain port.

49. A variable speed fan drive according to claim 47 wherein the valve cavity has a lube passage which communicates with the oil galley in the housing.

50. A variable speed fan drive according to claim 47 wherein an oil exhaust port passage communicates between an opening in the mounting flange portion of the housing and the oil galley in the housing.

51. A variable speed fan drive according to claim 41 wherein the piston comprises a main piston body, a reduced diameter portion, an anti-rotation dowel and a bearing mount inside the main piston body.

52. A variable speed fan drive according to claim 51 wherein the hub is a generally cylindrical member having a shaft bore, a sheave mounting flange and a bearing mounting surface.

53. A variable speed fan drive according to claim 51 wherein the hub and drive shaft are journaled in the bearing mount of the piston by way of a bearing.

54. A variable speed fan drive according to claim 53 wherein the hub, shaft, and piston are mounted in the housing such that the shaft is journaled in the housing by way of a bearing.

55. A variable speed fan drive according to claim 51 wherein the anti-rotation dowel of the piston is disposed in the anti-rotation aperture of the housing to prevent relative rotation therebetween.

56. A variable speed fan drive according to claim 53 wherein the spur gear is mounted on a gear mounting surface of the shaft extending out of the housing.

57. A variable speed fan drive according to claim 50 wherein a valve is fitted into the valve mounting boss so that a portion thereof is disposed in the valve cavity.

58. A variable speed fan drive according to claim 57 wherein the valve is electrically connected with an engine controller.

59. A variable speed fan drive according to claim 58 wherein the engine controller sends actuation signals to the valve based upon fan speed, vehicle and engine parameters.

60. A variable speed fan drive according to claim 59 wherein when an appropriate signal is received by the valve it is actuated such that pressurized oil from the engine oil galley is allowed to flow into the first oil passage to the piston chamber so as to translate the piston in the chamber along with the hub and first sheave half.

61. A variable speed fan drive according to claim 60 wherein when the valve is actuated such that the oil inlet is closed, oil is allowed to exhaust from the piston chamber through passages to the oil galley in the housing and out to the oil exhaust port opening by way of the oil exhaust port passage to be returned to the engine oil galley.

62. A variable speed fan drive according to claim 57 wherein the valve is a solenoid operated 4 way 3 position hydraulic valve used as a 3 way 3 position valve.

63. A variable speed fan drive according to claim 62 wherein in a first position the oil inlet passage is connected directly with the lube passage while the passage to the piston chamber is blocked so that no pressurized oil is provided to the piston chamber.

64. A variable speed fan drive according to claim 62 wherein in a second position the lube passage is blocked, the oil inlet passage is connected with the oil passage to the piston chamber so that pressurized oil is directed into the piston chamber thereby actuating the piston.

65. A variable speed fan drive according to claim 62 wherein in a third position the pressurized oil inlet passage is blocked and the oil passage to the piston chamber is connected with the lube passage allowing oil to drain from the piston chamber.

66. A drive side assembly for a fan drive of a vehicle powered by an internal combustion engine, the fan drive having the drive side assembly and also a driven side assembly, the drive side assembly being drivingly connected to a fan by way of the driven side assembly and comprising:
   a housing having a piston chamber therein;
   a piston disposed in the piston chamber of the housing;
   a valve connected to a source of fluid pressure and to the piston chamber;
   a shaft driven by the internal combustion engine, the shaft being journaled in the housing;
   a hub journaled in the piston and slidingly mounted on the shaft;
   a first sheave half mounted to the hub; and,
   a second sheave half mounted to the shaft;
wherein the valve is operative to selectively provide fluid pressure to the piston chamber thereby actuating the piston so as to move the hub and first sheave half relative to the shaft and second sheave half to vary the speed of the fan.

67. A drive side assembly for a fan drive according to claim 66 further comprising a spur gear mounted on the shaft.

68. A drive side assembly for a fan drive according to claim 66 wherein an anti-rotation aperture is provided in the chamber.

69. A drive side assembly for a fan drive according to claim 66 wherein a valve boss having a valve cavity therein, is provided on the housing adjacent to the piston chamber.

70. A drive side assembly for a fan drive according to claim 69 wherein an oil inlet communicates with the valve cavity as does a first oil passage to the piston chamber.

71. A drive side assembly for a fan drive according to claim 70 wherein the oil inlet includes a flow limiting orifice.

72. A drive side assembly for a fan drive according to claim 70 wherein the housing includes a second oil passage communicating between the piston chamber and a drain port.

73. A drive side assembly for a fan drive according to claim 72 wherein the drain port further communicates with an oil galley in the housing.

74. A drive side assembly for a fan drive according to claim 73 wherein a plug with a seat is fitted in the drain port.

75. A drive side assembly for a fan drive according to claim 73 wherein the valve cavity has a lube passage which communicates with the oil galley in the housing.

76. A drive side assembly for a fan drive according to claim 73 wherein an oil exhaust port passage communicates between an opening in a mounting flange portion of the housing and the oil galley in the housing.

77. A drive side assembly for a fan drive according to claim 68 wherein the piston comprises a main piston body, a reduced diameter portion, an anti-rotation dowel and a bearing mount inside the main piston body.

78. A drive side assembly for a fan drive according to claim 77 wherein the hub is a generally cylindrical member having a shaft bore, a sheave mounting flange and a bearing mounting surface.

79. A drive side assembly for a fan drive according to claim 78 wherein the hub and drive shaft are journaled in the bearing mount of the piston by way of a bearing.

80. A drive side assembly for a fan drive according to claim 79 wherein the hub, shaft, and piston are mounted in the housing such that the shaft is journaled in the housing by way of a bearing.

81. A drive side assembly for a fan drive according to claim 80 wherein the anti-rotation dowel of the piston is disposed in the anti-rotation aperture of the housing to prevent relative rotation therebetween.

82. A drive side assembly for a fan drive according to claim 81 wherein the spur gear is mounted on a gear mounting surface of the shaft extending out of the housing.

83. A drive side assembly for a fan drive according to claim 76 wherein the valve is fitted into the valve mounting boss so that a portion thereof is disposed in the valve cavity.

84. A drive side assembly for a fan drive according to claim 83 wherein the valve is electrically connected with an engine controller.

85. A drive side assembly for a fan drive according to claim 84 wherein the engine controller sends actuation signals to the valve based upon fan speed, vehicle and engine parameters.

86. A drive side assembly for a fan drive according to claim 85 wherein when an appropriate signal is received by the valve it is actuated such that pressurized oil from the engine oil galley is allowed to flow into the first oil passage to the piston chamber so as to translate the piston in the chamber along with the hub and first sheave half.

87. A drive side assembly for a fan drive according to claim 86 wherein when the valve is actuated such that the oil inlet is closed, oil is allowed to exhaust from the piston chamber through passages to the oil galley in the housing and out to the oil exhaust port opening by way of the oil exhaust port passage to be returned to the engine oil galley.

88. A drive side assembly for a fan drive according to claim 84 wherein the valve is a solenoid operated 4 way 3 position hydraulic valve used as a 3 way 3 position valve.

89. A drive side assembly for a fan drive according to claim 88 wherein in a first position the oil inlet passage is connected directly with the lube passage while the passage to the piston chamber is blocked so that no pressurized oil is provided to the piston chamber.

90. A drive side assembly for a fan drive according to claim 88 wherein in a second position the lube passage is blocked, the oil inlet passage is connected with the oil passage to the piston chamber so that pressurized oil is directed into the piston chamber thereby actuating the piston.

91. A drive side assembly for a fan drive according to claim 88 wherein in a third position the pressurized oil inlet passage is blocked and the oil passage to the piston chamber is connected with the lube passage allowing oil to drain from the piston chamber.

* * * * *